United States Patent
Ghosh et al.

(10) Patent No.: US 11,090,640 B2
(45) Date of Patent: Aug. 17, 2021

(54) PROCESS FOR PRODUCING BTX FROM A $C_5$–$C_{12}$ HYDROCARBON MIXTURE

(71) Applicant: SABIC GLOBAL TECHNOLOGIES B.V., Bergen Op Zoom (NL)

(72) Inventors: Ashim Kumar Ghosh, Sugar Land, TX (US); Alla Khanmamedova, Sugar Land, TX (US); Scott A. Stevenson, Sugar Land, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 91 days.

(21) Appl. No.: 16/342,488

(22) PCT Filed: Oct. 17, 2017

(86) PCT No.: PCT/IB2017/056442
§ 371 (c)(1),
(2) Date: Apr. 16, 2019

(87) PCT Pub. No.: WO2018/073743
PCT Pub. Date: Apr. 26, 2018

(65) Prior Publication Data
US 2019/0247837 A1    Aug. 15, 2019

(30) Foreign Application Priority Data
Oct. 17, 2016    (EP) ..................... 16194126

(51) Int. Cl.
| | | |
|---|---|---|
| *B01J 29/44* | (2006.01) | |
| *B01J 37/08* | (2006.01) | |
| *C10G 47/18* | (2006.01) | |
| *B01J 37/06* | (2006.01) | |
| *B01J 37/02* | (2006.01) | |
| *B01J 23/42* | (2006.01) | |
| *B01J 29/40* | (2006.01) | |
| *B01J 21/04* | (2006.01) | |
| *B01J 35/02* | (2006.01) | |
| *B01J 37/00* | (2006.01) | |

(52) U.S. Cl.
CPC ............ *B01J 29/44* (2013.01); *B01J 21/04* (2013.01); *B01J 23/42* (2013.01); *B01J 29/40* (2013.01); *B01J 35/02* (2013.01); *B01J 37/0018* (2013.01); *B01J 37/0201* (2013.01); *B01J 37/0205* (2013.01); *B01J 37/0207* (2013.01); *B01J 37/06* (2013.01); *B01J 37/08* (2013.01); *B01J 37/088* (2013.01); *C10G 47/18* (2013.01); *B01J 2229/186* (2013.01); *C10G 2300/104* (2013.01); *C10G 2300/70* (2013.01); *C10G 2400/30* (2013.01)

(58) Field of Classification Search
CPC ............ B01J 21/04; B01J 23/42; B01J 29/40; B01J 29/44; B01J 35/02; B01J 37/0009; B01J 37/0018; B01J 37/0201; B01J 37/0205; B01J 37/0207; B01J 37/0215; B01J 37/08; B01J 37/088; B01J 37/06; B01J 2229/186; C10G 47/18; C10G 2300/70; C10G 2300/104; C10G 2400/30

See application file for complete search history.

(56) References Cited

U.S. PATENT DOCUMENTS

| | | | |
|---|---|---|---|
| 3,957,621 A | 5/1976 | Bonacci et al. | |
| 4,120,910 A | 10/1978 | Chu | |
| 5,034,362 A * | 7/1991 | Chu .......................... | C07C 2/66 502/60 |
| 5,292,696 A | 3/1994 | Ito et al. | |
| 6,153,087 A | 11/2000 | Bigeard et al. | |
| 6,270,654 B1 | 8/2001 | Colyar et al. | |
| 7,186,872 B2 | 3/2007 | Juttu et al. | |
| 7,214,308 B2 | 5/2007 | Colyar | |

(Continued)

FOREIGN PATENT DOCUMENTS

| | | | |
|---|---|---|---|
| CN | 1364099 | 8/2002 | |
| EP | 3176243 | 6/1917 | |
| EP | 3176243 A1 * | 6/2017 | ............. C10G 45/64 |
| WO | WO 2016/146326 | 9/1916 | |

(Continued)

OTHER PUBLICATIONS

Folefoc & Dwyer, "Dispersion of Platinum in Pt/ZSM-5 Zeolites" *Journal of Catalysis*, 1992, 136:43-49.
International Search Report and Written Opinion issued in International Patent Application No. PCT/IB2017/056442, dated Feb. 14, 2018.
Tsai et al., "Benzene hydrogenation over Pt/siliceous zeolites" *Studies in Surface Science and Catalysis*, 2005, 158:1929-1936.
Yamasaki et al., "Characterization of the active sites on Pt-loaded ZSM-5 (Pt/ZSM-5) prepared by an ion-exchange method for the oxidation of CO at low temperatures" *Catalysis Letters*, 2003, 91(1-2):111-113.
European Search Report issued in corresponding European Patent Application No. 16194126.5, dated Mar. 31, 2017.

*Primary Examiner* — Brian A McCaig
(74) *Attorney, Agent, or Firm* — Norton Rose Fulbright US LLP

(57) ABSTRACT

A method for preparing a hydrocracking catalyst comprising: (i) providing a shaped body comprising a zeolite and a binder, wherein the shaped body has been obtained by shaping, calcination and cooling, wherein the zeolite is ZSM-5 having a silica ($SiO_2$) to alumina ($Al_2O_3$) molar ratio of 25-75; (ii) optionally drying the shaped body at a temperature of 100-300° C. for a period of at least 1 hour; (iii) depositing a hydrogenation metal on the shaped body by an impregnation for a period of at most 2 hours such that the amount of the hydrogenation metal is 0.010-0.30 wt % with respect to the total catalyst; (iv) optionally rinsing the metal deposited shaped body with water; and (v) heat-treating the metal deposited shaped body in air at a temperature of 250-300° C. for a period of 1-5 hours; wherein the catalyst comprises a total of less than 0.05 wt % sodium and cesium.

19 Claims, No Drawings

(56) References Cited

U.S. PATENT DOCUMENTS

| | | |
|---|---|---|
| 7,704,377 B2 | 4/2010 | Duddy et al. |
| 7,938,952 B2 | 5/2011 | Colyar et al. |
| 8,926,824 B2 | 1/2015 | Morel |
| 9,005,430 B2 | 4/2015 | Fournier et al. |
| 9,840,674 B2 | 12/2017 | Weiss et al. |
| 2004/0082461 A1 | 4/2004 | Renans et al. |
| 2006/0287564 A1 | 12/2006 | Choi et al. |
| 2007/0112237 A1 | 5/2007 | Lee et al. |
| 2008/0093262 A1 | 4/2008 | Gragnani et al. |
| 2009/0272672 A1 | 11/2009 | Arca et al. |
| 2014/0039233 A1 | 2/2014 | Laha et al. |
| 2014/0299515 A1 | 10/2014 | Weiss et al. |
| 2014/0316179 A1 | 10/2014 | Ghosh et al. |
| 2016/0122666 A1 | 5/2016 | Weiss et al. |

FOREIGN PATENT DOCUMENTS

| | | | |
|---|---|---|---|
| WO | WO 2016/177749 | 11/1916 | |
| WO | WO 2017/032672 | 3/1917 | |
| WO | WO 02/44306 | 6/2002 | |
| WO | WO 2006/054527 | 5/2006 | |
| WO | WO 2007/055488 | 5/2007 | |
| WO | WO-2007048616 A2 * | 5/2007 | ............. C10G 65/12 |
| WO | WO 2010/102712 | 9/2010 | |
| WO | WO 2013/182534 | 12/2013 | |
| WO | WO 2016/005297 | 1/2016 | |

* cited by examiner

US 11,090,640 B2

PROCESS FOR PRODUCING BTX FROM A C₅—C₁₂ HYDROCARBON MIXTURE

CROSS-REFERENCE TO RELATED APPLICATIONS

This application is a national phase under 35 U.S.C. § 371 of International Application No. PCT/IB2017/056442, filed Oct. 17, 2017, which claims the benefit of priority to European Patent Application No. 16194126.5, filed Oct. 17, 2016, the entire contents of each of which are hereby incorporated by reference in their entirety.

BACKGROUND OF THE INVENTION

The present invention relates to a method for preparing a hydrocracking catalyst. The invention further relates to a process for producing BTX from a mixed feedstream comprising $C_5$-$C_{12}$ hydrocarbons by contacting said feedstream in the presence of hydrogen with such catalyst.

It has been previously described in WO 02/44306 A1 and WO 2007/055488 A1 that aromatic hydrocarbon compounds and LPG (liquefied petroleum gas; a mixture of $C_2$, $C_3$, and $C_4$ hydrocarbons) can be produced from a mixed hydrocarbon feedstock having boiling points of 30-250° C. Therefore a hydrocarbon feedstock having boiling points of 30-250° C. and hydrogen is introduced to a reaction zone wherein said hydrocarbon feedstock is converted in the presence of a catalyst to aromatic hydrocarbon compounds abundant in BTX through hydrodealkylation and/or transalkylation and to non-aromatic hydrocarbon compounds which are abundant in LPG through hydrocracking and recovering the aromatic hydrocarbon compounds and LPG, respectively, through gas-liquid separation and distillation. The methods of WO 02/44306 A1 and WO 2007/055488 produce a product stream comprising a relatively high amount of non-aromatic hydrocarbons that co-boil with BTX rendering it impossible to produce chemical grade BTX without using solvent extraction methods and a relatively high amount of fuel gas at the expense of the LPG produced.

US2009/0272672 discloses a process for the catalytic hydrodealkylation of $C_8$-$C_{13}$ alkylaromatic compounds mixed with $C_4$-$C_{10}$ aliphatic and cycloaliphatic products which undergo aromatization and subsequent hydrodealkylation. In this process, the hydrocarbons are treated with a ZSM-5 zeolite having the $SiO_2/Al_2O_3$ molar ratio of 5-100 modified by means of a platinum-molybdenum couple at a temperature of 400 to 650° C., a pressure of 2 to 4 MPa and Hz/feedstock molar ratio ranging from 3 to 6.

US2006/0287564 describes a process for increasing the production of benzene from a hydrocarbon mixture including separating a hydrocarbon feedstock into a $C_6$ or lower hydrocarbon stream and a $C_7$ or higher hydrocarbon stream. The $C_6$ or lower hydrocarbon stream is separated into a non-aromatic hydrocarbon stream and an aromatic hydrocarbon stream through a solvent extraction process. The $C_7$ or higher hydrocarbon stream is subjected to a reaction in the presence of a catalyst comprising platinum/tin or platinum/lead.

U.S. Pat. No. 3,957,621 describes a process for processing heavy reformates from which benzene and lighter components have been largely removed. The removed stream includes the major portion of the benzene in the charge and can include a substantial portion of the toluene.

WO2013/182534 discloses a process for producing BTX from a $C_5$-$C_{12}$ hydrocarbon mixture using a hydrocracking/hydrodesulphurisation catalyst. According to WO2013/182534, the process results in a mixture comprising substantially no co-boilers of BTX, thus chemical grade BTX can easily be obtained.

While WO2013182534 advantageously provides a chemical grade BTX, there is a demand for a process which produces an effluent having a composition which comprises more amounts of desirable components such as BTX and LPG and less amounts of components such as methane.

US2004/082461 discloses a method for impregnating a Group VIII metal on a molecular sieve-binder extrudate wherein the binder comprises a low acidity refractory oxide binder material, which is essentially free of alumina, by a) contacting the molecular sieve-binder extrudate with an aqueous solution of a corresponding Group VIII metal nitrate salt having a pH of below 8, wherein the molar ratio between the Group VIII metal cations in the solution and the number of sorption sites present in the extrudate is equal to or larger than 1, and b) drying the molecular sieve-binder extrudate obtained from step a).

US2014/0316179 discloses a method of preparing hydrocarbon aromatization catalyst. The method of making a formed catalyst can comprise: mixing an uncalcined Ge-ZSM-5 zeolite and a binder to form a mixture; forming the mixture into a formed zeolite; calcining the formed zeolite to result in the formed zeolite having less than or equal to 0.1 wt % of residual carbon; ion-exchanging the formed zeolite with cesium to be non-acidic; depositing platinum on the formed zeolite; and heating the formed zeolite to result in a final catalyst; wherein the final catalyst comprises 4.0 to 4.8 wt % cesium and 0.4 to 1.5 wt % platinum.

US2014/039233 discloses a catalyst composition suitable for conversion of alkanes having 3 to 12 carbon atoms per molecule to aromatic hydrocarbons, wherein the catalyst composition comprises: MN/MA/Ga-zeolite, wherein MN stands for one or more noble metals and MA stands for one or more alkali metals and/or alkaline earth metals. The MN/MA/Ga-zeolite is a zeolite comprising: 0.01-10 wt % of MN with respect to the total MN/MA/Ga-zeolite; 0.01-10 wt % of MA with respect to the total MN/MA/Ga-zeolite; and 0.01-10 wt % Ga with respect to the total MN/MA/Ga-zeolite.

In a non-published co-pending application PCT/EP2016/069554, a process for producing BTX using a hydrocracking catalyst is described, wherein the hydrocracking catalyst comprises a shaped body comprising a zeolite and a binder and a hydrogenation metal deposited on the shaped body, wherein the amount of the hydrogenation metal is 0.010-0.30 wt % with respect to the total catalyst and wherein the zeolite is ZSM-5 having a silica ($SiO_2$) to alumina ($Al_2O_3$) molar ratio of 25-75. This application shows that such catalyst comprising a ZSM-5 having a silica ($SiO_2$) to alumina ($Al_2O_3$) molar ratio of 25-75 results in a hydrocracking product stream comprising a low proportion of methane and substantially no co-boilers of BTX at a sufficiently high WHSV.

Preparing a hydrocracking catalyst can involve the multiple steps of: providing a shaped body comprising a zeolite and a binder, calcining the shaped body formed, further drying the shaped body, depositing a hydrogenation metal on the shaped body, rinsing or washing the shaped body deposited with the hydrogenation metal, and heat-treating it.

It would be desirable to provide a hydrocracking catalyst with desirable activity in an efficient manner by saving time, energy and material in one or more of these steps.

It is an objective of the present invention to provide a method for preparing a hydrocracking catalyst and a process for converting a $C_5$-$C_{12}$ hydrocarbon feed stream into a product stream comprising BTX in which above and/or other needs are met.

SUMMARY OF THE INVENTION

Accordingly, the present invention provides a method for preparing a hydrocracking catalyst comprising:

(i) providing a shaped body comprising a zeolite and a binder, wherein the shaped body has been obtained by shaping, calcination and cooling, wherein the zeolite is ZSM-5 having a silica ($SiO_2$) to alumina ($Al_2O_3$) molar ratio of 25-75, (ii) optionally drying the shaped body at a temperature of 100-300° C. for a period of at least 1 hour, (iii) depositing a hydrogenation metal on the shaped body by an impregnation for a period of at most 2 hours such that the amount of the hydrogenation metal is 0.010-0.30 wt % with respect to the total catalyst, (iv) optionally rinsing the metal deposited shaped body with water and (v) heat-treating the metal deposited shaped body in air at a temperature of 250-300° C. for a period of 1-5 hours.

The present invention further provides a process for producing BTX comprising preparing the hydrocracking catalyst according to the method according to the invention and further steps of:

(a) providing a hydrocracking feed stream comprising $C_5$-$C_{12}$ hydrocarbons, (b) contacting the hydrocracking feed stream in the presence of hydrogen with a hydrocracking catalyst under process conditions including a temperature of 425-580° C., a pressure of 300-5000 kPa gauge and a Weight Hourly Space Velocity of 3-30 to produce a hydrocracking product stream comprising BTX and (c) separating the BTX from the hydrocracking product stream.

The hydrocracking catalyst obtained by the method according to the invention, which is used in the process for producing BTX according to the invention, comprises a shaped body comprising a zeolite and a binder and a hydrogenation metal deposited on the shaped body, wherein the amount of the hydrogenation metal is 0.010-0.30 wt % with respect to the total catalyst and wherein the zeolite is ZSM-5 having a silica ($SiO_2$) to alumina ($Al_2O_3$) molar ratio of 25-75. The zeolite in the shaped catalyst is in the hydrogen form.

DETAILED DESCRIPTION

The inventors surprisingly found that a high performance catalyst having a silica ($SiO_2$) to alumina ($Al_2O_3$) molar ratio of 25-75 can be prepared in an extremely efficient manner by omitting or shortening the periods of certain steps which were generally believed to be necessary for the preparation of catalysts.

It has been considered necessary in the prior art to subject the shaped body comprising a zeolite and a binder to pre-drying before the deposition of a hydrogenation catalyst. It was found that such pre-drying is not necessary for the shaped body according to the invention for providing the desired catalyst performance.

The shaped body is subjected to an impregnation for depositing the hydrogenation metal on the shaped body. It was surprisingly found that the duration of the impregnation can be dramatically reduced, i.e. to a period of at most 2 hours to provide the desired catalyst performance. Typically, the duration of the impregnation in the conventional processes was at a temperature of about 60° C. for a period of 24 hours.

It has also been found that the step of rinsing or washing of the metal deposited shaped body with water can be omitted. The terms "rinsing" and "washing" are herein used interchangeably. The rinsing or washing in the conventional processes required a large amount of DI water, and thus the omission of this step saves cost.

The product thus obtained is subsequently calcined, also for a short period of time, i.e. at most 5 hours. Typically, the duration of the calcination in the conventional processes was 20-24 hours.

Thus, the method according to the invention provides a catalyst in a very short period of time compared to the method known in the art and still provides a catalyst with a desired catalyst performance.

The process according to the invention using the catalyst thus obtained results in a hydrocracking product stream comprising a low proportion of methane and substantially no co-boilers of BTX at a sufficiently high WHSV. A low proportion of methane means that more valuable components such as $C_2$-$C_4$ hydrocarbons and BTX are present in the hydrocracking product stream. The absence of co-boilers of BTX in the product stream allows obtaining a chemical grade BTX by simple distillation of the product stream. This can be achieved at a relatively high level of WHSV, which means that the desired product can be obtained at a higher rate requiring smaller volume reactor resulting in a smaller capital expenditure (CAPEX).

As used herein, the term "$C_n$ hydrocarbons", wherein "n" is a positive integer, is meant to describe all hydrocarbons having n carbon atoms. Moreover, the term "$C_{n+}$ hydrocarbons" is meant to describe all hydrocarbon molecules having n or more carbon atoms. Accordingly, the term "$C_{5+}$ hydrocarbons" is meant to describe a mixture of hydrocarbons having 5 or more carbon atoms.

Step a)

According to step a) of the process according to the invention, a hydrocracking feed stream comprising $C_5$-$C_{12}$ hydrocarbons is provided.

Hydrocracking Feed Stream

The hydrocracking feed stream used in the process of the present invention is a mixture comprising $C_5$-$C_{12}$ hydrocarbons, preferably having a boiling point in the range of 30-195° C. Preferably, the hydrocracking feed stream mainly comprises $C_6$-$C_8$ hydrocarbons.

The hydrocracking feed stream may be provided by providing a fresh feed stream and optionally mixing it with another stream, such as a stream recycled from the hydrocracking product stream, such as toluene if desired. This mixing with another stream is optional. If mixing with e.g. a recycle stream does not take place, the hydrocracking feed stream is the same as the fresh feed stream. Suitable examples of fresh feed streams include, but are not limited to first stage or multi-stage hydro-treated pyrolysis gasoline, straight run naphtha, hydrocracked gasoline, light coker naphtha and coke oven light oil, FCC gasoline, reformate or mixtures thereof, which have optionally been subjected to treatments such as hydrogenation, enrichment of monoaromatic compounds and/or depentanization.

For instance, a typical composition of first stage hydrotreated pyrolysis gasoline may comprise 10-15 wt % $C_5$ olefins, 2-4 wt % $C_5$ paraffins and cycloparaffins, 3-6 wt % $C_6$ olefins, 1-3 wt % $C_6$ paraffins and naphthenes, 25-30 wt % benzene, 15-20 wt % toluene, 2-5 wt % ethylbenzene, 3-6 wt % xylenes, 1-3 wt % trimethylbenzenes, 4-8 wt % dicyclopentadiene, and 10-15 wt % $C_{9+}$ aromatics, alkylstyrenes and indenes; see e.g. Table E3.1 from Applied Heterogeneous Catalysis: Design, Manufacture, and Use of Solid Catalysts (1987) J. F. Le Page.

It is preferred that the non-aromatic species comprised in the hydrocracking feed stream are saturated (e.g. by the prior hydrogenation) in order to reduce the exotherm within the catalyst bed containing the hydrocracking catalyst used in the present process. Accordingly, preferably, the fresh feed stream is a stream which has been hydrogenated. The hydrogenation advantageously has a further function of hydrodesulphurisation. This is advantageous in that the resulting fresh feed stream has a low sulphur content. The low sulphur content in the fresh feed stream is advantageous in that the hydrocracking catalyst used according to the invention does not need to have a hydrodesulphurisation function.

The fresh feed stream or the hydrocracking feed stream used in the process of the present invention may comprise up to 300 wppm of sulphur (i.e. the weight of sulphur atoms, present in any compound, in relation to the total weight of the feed).

In some embodiments, the fresh feed stream used in the process of the present invention is a stream which has been treated to be enriched in mono-aromatic compounds. As used herein, the term "mono-aromatic compound" relates to a hydrocarbon compound having only one aromatic ring. Means and methods suitable to enrich the content of mono-aromatic compounds in a mixed hydrocarbon stream are well known in the art such as the Maxene process; see Bhirud (2002) Proceedings of the DGMK-conference 115-122.

In some embodiments, the fresh feed stream used in the process of the present invention has been depentanised. Preferably, the fresh feed stream comprises at most 5 wt % of $C_5$ hydrocarbons, more preferably at most 4 wt %, at most 3 wt %, at most 2 wt %, at most 1 wt %, or $C_5$ hydrocarbons.

Preferably, the hydrocracking feed stream is provided by a process which does not involve the step of removing benzene or removing $C_6$ hydrocarbons. This means that intentional removal of benzene has not been performed in providing the hydrocracking feed stream or the fresh feed stream. According to the present invention, the benzene coboilers present in the hydrocracking feed stream are advantageously converted to useful LPG.

Preferably, the hydrocracking feed stream may comprise at least 10 wt % of benzene, for example at least 20 wt % of benzene, at least 30 wt % of benzene or at least 40 wt % of benzene, and/or at most 90 wt % of benzene, for example at most 80 wt %, at most 70 wt %, at most 60 wt % or at most 50 wt % of benzene.

Preferably, the fresh feed stream may comprise at least 10 wt % of benzene, for example at least 20 wt % of benzene, at least 30 wt % of benzene or at least 40 wt % of benzene, and/or at most 90 wt % of benzene, for example at most 80 wt %, at most 70 wt %, at most 60 wt % or at most 50 wt % of benzene.

Step b)

According to step b) of the process according to the invention, the hydrocracking feed stream is contacted in the presence of hydrogen in a hydrocracking reactor with the hydrocracking catalyst prepared according to the method of the invention.

The product produced by the hydrocracking step of the process of the present invention (hydrocracking product stream) comprises LPG, BTX and methane.

The term "LPG" as used herein refers to the well-established acronym for the term "liquefied petroleum gas". LPG generally consists of a blend of $C_2$-$C_4$ hydrocarbons i.e. a mixture of $C_2$, $C_3$, and $C_4$ hydrocarbons.

The term "BTX" as used herein is well known in the art and relates to a mixture of benzene, toluene and xylenes.

As used herein, the term "chemical grade BTX" relates to a hydrocarbon mixture comprising less than 5 wt % hydrocarbons other than benzene, toluene and xylenes, preferably less than 4 wt % hydrocarbons other than benzene, toluene and xylenes, more preferably less than 3 wt % hydrocarbons other than benzene, toluene and xylenes, and most preferably less than 2.5 wt % hydrocarbons other than benzene, toluene and xylenes.

Furthermore, the "chemical grade BTX" produced by the process of the present invention comprises less than 1 wt % non-aromatic $C_{6+}$ hydrocarbons, preferably less than 0.7 wt % non-aromatic $C_{6+}$ hydrocarbons, more preferably less than 0.5 wt % non-aromatic $C_{6+}$ hydrocarbons and most preferably less than 0.2 wt % non-aromatic $C_{6+}$ hydrocarbons. The most critical contaminants are the non-aromatic species which have boiling points close to benzene including, but not limited to, cyclohexane, methylcyclopentane, n-hexane, 2-methylpentane and 3-methylpentane. The most critical non-aromatic species which have boiling points close to toluene include 2.4-dimethylpentane, 3,3-dimethylpentane and 2,2-dimethylpentane.

Accordingly, the hydrocracking product stream is substantially free from non-aromatic $C_{6+}$ hydrocarbons. As meant herein, the term "hydrocracking product stream substantially free from non-aromatic $C_{6+}$ hydrocarbons" means that said hydrocracking product stream comprises less than 1 wt % non-aromatic $C_{6+}$ hydrocarbons, preferably less than 0.7 wt % non-aromatic $C_{6+}$ hydrocarbons, more preferably less than 0.5 wt % non-aromatic $C_{6+}$ hydrocarbons and most preferably less than 0.2 wt % non-aromatic $C_{6+}$ hydrocarbons.

The term "aromatic hydrocarbon" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons.

The hydrocracking product stream produced in the process of the present invention preferably comprises less than 5 wt % of methane. Preferably, the hydrocracking product stream produced in the process of the present invention comprises less than 4 wt % of methane, more preferably less than 3 wt % methane, even more preferably less than 2 wt % methane, even more preferably less than 1.5 wt % methane, even more preferably less than 1.4 wt % methane, even more preferably less than 1.3 wt % methane, even more preferably less than 1.2 wt % methane, even more preferably less than 1.1 wt % methane, and most preferably less than 1 wt % methane.

Preferably, the hydrocracking product stream is also substantially free from $C_5$ hydrocarbons. As meant herein, the term "hydrocracking product stream substantially free from $C_5$ hydrocarbons" means that said hydrocracking product stream comprises less than 1 wt % $C_5$ hydrocarbons, preferably less than 0.7 wt % $C_5$ hydrocarbons, more preferably less than 0.6 wt % $C_5$ hydrocarbons and most preferably less than 0.5 wt % $C_5$ hydrocarbons.

It is a particular advantage of the method of the present invention that the hydrocracking product stream is substantially free from non-aromatic $C_{6+}$ hydrocarbons as these hydrocarbons usually have boiling points close to the boiling point of $C_{6+}$ aromatic hydrocarbons. Hence, it can be difficult to separate the non-aromatic $C_{6+}$ hydrocarbons from the aromatic $C_{6+}$ hydrocarbons comprised in the hydrocracking product stream by distillation.

Process Conditions

The process conditions under which the hydrocracking of the feedstream is performed are an important determinant for the composition of the hydrocracking product stream.

In general, when the space velocity is too high, not all co-boilers of BTX are hydrocracked, so it will not be possible to obtain a chemical grade BTX by simple distillation of the product stream. However, at too low space velocity the yield of methane rises at the expense of propane and butane. Also, a higher space velocity requires smaller reactor volumes and thus a lower CAPEX. Hence, it is advantageous to perform the process of the invention at a high space velocity at which substantially all co-boilers of BTX are hydrocracked.

It was found that the hydrocracking step (b) can advantageously be performed at a high space velocity while allowing substantially all co-boilers of BTX to be hydrocracked, due to the high activity of the catalyst. In the catalyst used in the process of the invention, without wishing to be bound by theory, the hydrogenation metal and the zeolite are in close proximity to one another which translates into a shorter diffusion length between the two sites. This allows BTX co-boilers to be hydrocracked at a high space velocity.

Accordingly, in some preferred embodiments, the step (b) is performed at a Weight Hourly Space Velocity (WHSV) of 3-30 $h^{-1}$, for example at least 5 $h^{-1}$, at least 6 $h^{-1}$, at least 7 $h^{-1}$ or at least 8 $h^{-1}$, and/or at most 25 $h^{-1}$, at most 20 $h^{-1}$, at most 15 $h^{-1}$, at most 10 $h^{-1}$. High WHSV such as at least 8 $h^{-1}$ allows particularly small reactor volumes and lower CAPEX.

It has also been found that step (b) can be operated at a relatively low temperature. This allows for greater operational flexibility as well as lower heat duty and may allow longer cycle lengths. Accordingly, in some preferred embodiments, the step (b) is performed at a temperature of 425-445° C. In other embodiments, the step (b) is performed at a temperature of 450-580° C. The higher temperature range results in a high hydrocracking conversion rate.

The hydrocracking of the feedstream is performed at a pressure of 300-5000 kPa gauge, more preferably at a pressure of 600-3000 kPa gauge, particularly preferably at a pressure of 1000-2000 kPa gauge and most preferably at a pressure of 1200-1600 kPa gauge. By increasing reactor pressure, conversion of $C_{5+}$ non-aromatics can be increased, but higher pressure also increases the yield of methane and the hydrogenation of aromatic rings to cyclohexane species which can be cracked to LPG species. This results in a reduction in aromatic yield as the pressure is increased and, as some cyclohexane and its isomer methylcyclopentane, are not fully hydrocracked, a pressure of 1200-1600 kPa may result in a high purity of the resultant benzene.

The hydrocracking step is performed in the presence of an excess of hydrogen in the reaction mixture. This means that a more than stoichiometric amount of hydrogen is present in the reaction mixture that is subjected to hydrocracking. Preferably, the molar ratio of hydrogen to hydrocarbon species ($H_2$/HC molar ratio) in the reactor feed is between 1:1 and 4:1, preferably between 1:1 and 3:1 and most preferably between 2:1 and 3:1. A higher benzene purity in the product stream can be obtained by selecting a relatively low $H_2$/HC molar ratio. In this context the term "hydrocarbon species" means all hydrocarbon molecules present in the reactor feed such as benzene, toluene, hexane, cyclohexane, etc. It is necessary to know the composition of the feed to then calculate the average molecular weight of this stream to be able to calculate the correct hydrogen feed rate. The excess amount of hydrogen in the reaction mixture suppresses the coke formation which is believed to lead to catalyst deactivation.

Catalyst

The catalyst used in the process of the present invention is prepared by the method of the invention.

In step (i) of the method of the invention for preparing a hydrocracking catalyst, a shaped body comprising a zeolite and a binder is provided, wherein the zeolite is ZSM-5 having a silica ($SiO_2$) to alumina ($Al_2O_3$) molar ratio of 25-75. The shaped body has been obtained by shaping, e.g. extruding, the zeolite and the binder into the desired shape, calcining it in air, e.g. at a temperature between 400° C. and 600° C., e.g. for a period of 1 to 16 h, and cooling it to room temperature. Such shaped body obtained by shaping (extrusion) and subsequent calcination and cooling is commercially available. The shaped body is stored until further use.

The shaped body stored at a room temperature may be subjected to the drying step (ii) of drying the shaped body at temperatures of 100-300° C. for a period of at least 1 hour, before step (iii). When step (ii) is performed, the drying is preferably performed at 200-300° C. for 1-2 hours. However, preferably, the method according to the invention does not comprise step (ii), i.e. step (iii) is performed without a heat treatment (which reaches 100° C.) after step (i).

In step (iii), the shaped body is subjected to a wet impregnation for depositing the hydrogenation metal on the shaped body. The impregnation is performed for a period of at most 2 hours, e.g. 0.5-2 hours or 0.5-1.5 hours, which is dramatically shorter than conventional processes. The impregnation may even be performed at room temperature, which further leads to cost reduction.

The shaped body stored with the deposited hydrogenation metal may be subjected to step (iv) of rinsing or washing, before step (v). The rinsing may be performed with a large volume of water, but may also be performed by placing the shaped body in a container with a relatively small amount of water (e.g. 5 times the volume of the shaped body). However, preferably, the method according to the invention does not comprise step (iv).

In step (v), shaped body stored with the deposited hydrogenation metal is heat-treated in air for a short period of time, i.e. 1-5 hours. The temperature is 250-300° C. and is preferably 270-290° C. Preferably, the heat-treatment is performed at temperatures of 270-290° C. for 1-3 hours.

In particularly preferred embodiments of the invention, the method according to the invention does not comprise step (ii) and does not comprise step (iv).

The hydrocracking catalyst used in the process of the present invention comprises a hydrogenation metal and a shaped body comprising a ZSM-5 zeolite and a binder, wherein the hydrogenation metal is deposited on the shaped body. Examples of the shaped bodies include, but are not limited to, spherically or cylindrically shaped pellets, tablets, particles and extrudates. The shaped body typically has an average diameter of about 0.1 mm to about 15 mm, for example about 1 mm to about 7 mm, typically 1.4 mm to 3.5 mm. The diameter is usually measured by slide caliper. The shaped body typically has an average length of 3 to 8 mm. The average as used herein is an arithmetic average. One specific example of the shaped body is cylindrically shaped extrudate with an average diameter of about 1.6 mm (1/16 inch) with an average length of extrudates about 3 to 8 mm. In such catalyst, the distance between the hydrogenation metal and the zeolite acid site is less than that in a mixed catalyst of a shaped zeolite body and hydrogenation metal supported on a binder. An example of the latter would be a mixture of ZSM-5 zeolite extrudate and Pt deposited on shaped $Al_2O_3$.

It was further observed that the process of the present invention results in a desirable LPG composition in the hydrocracking product stream. LPG with a high amount of $C_2$ hydrocarbons may generally be more valuable than LPG with a high amount of $C_3$ hydrocarbons. It was observed that the hydrocracking catalyst used in the present invention leads to a higher $C_2$ to $C_3$ ratio compared to a hydrocracking catalyst comprising a mixture of ZSM-5 zeolite extrudate and a hydrogenation metal deposited on shaped binder, when the hydrocracking feed stream is naphtha. Accordingly, the process of the present invention wherein the hydrocracking feed stream is naphtha can be advantageously used for producing a hydrocracking product stream comprising a high $C_2$ to $C_3$ ratio.

Zeolites are molecular sieves having three dimensional structures with well-defined channels, pores, cavities with defined pore size. As used herein, the term "zeolite" or "aluminosilicate zeolite" relates to an aluminosilicate molecular sieve. An overview of their characteristics is for example provided by the chapter on Molecular Sieves in Kirk-Othmer Encyclopedia of Chemical Technology, Volume 16, p 811-853; in Atlas of Zeolite Framework Types, 5th edition, (Elsevier, 2001). ZSM-5 zeolite is a medium pore size zeolite having a pore size of about 5-6 Å. ZSM-5 zeolite is a 10-member ring zeolite, i.e. the pore is formed by a ring consisting of 10 $[SiO_4]$ and $[AlO_4]^-$ tetrahedra. ZSM-5 zeolite is a zeolite having MFI structure. The negative charge arising from $[AlO_4]^-$ is neutralized by cation in the zeolite.

The silica ($SiO_2$) to alumina ($Al_2O_3$) molar ratio of the ZSM-5 zeolite is in the range of 25-75.

Using a zeolite having a $SiO_2$ to $Al_2O_3$ molar ratio of 25-75 shows the optimum catalyst performance as measured by activity (as measured by WHSV), benzene and total aromatics content (BTX, ethylbenzene (EB) and heavies) and methane in the product stream. Means and methods for quantifying the $SiO_2$ to $Al_2O_3$ molar ratio of a zeolite are well known in the art and include, but are not limited to AAS (Atomic Absorption Spectrometer), ICP (Inductively Coupled Plasma Spectrometry) analysis or XRF (X-ray fluorescence). It is noted that the $SiO_2$ to $Al_2O_3$ molar ratio referred herein is meant as the ratio in the zeolite prior to being mixed with the binder for forming the shaped body. Preferably, the $SiO_2$ to $Al_2O_3$ molar ratio is measured by XRF.

Preferably, the silica to alumina ratio of the ZSM-5 zeolite is in the range of 30-65, more preferably 35-60, more preferably in the range of 40-55. At such ratio, in particular when the silica to alumina ratio is at least 35, the best balance of total aromatics and methane content in the hydrocracking product stream and achievable WHSV for a desired benzene purity is obtained.

The zeolite is in the hydrogen form, i.e. having at least a portion of the original cations associated therewith replaced by $H^+$ ions. Methods to convert an aluminosilicate zeolite to the hydrogen form are well known in the art. A first method involves direct treatment employing an acid for example a mineral acid ($HNO_3$, HCl, etc.). A second method involves direct exchange using an ammonium salt (e.g. $NH_4NO_3$) followed by calcination.

As the zeolite is in the hydrogen form, it has not been base exchanged. For example, the zeolite is not base ion exchanged with sodium or cesium, preferably not base ion exchanged with an alkali or alkaline earth metal (e.g., Group IA and IIA of the Periodic Table of Elements). The present catalyst can comprise a total of less than 0.05 wt % sodium and cesium, preferably less than 0.04 wt %, or less than 0.01 wt %, based upon a total weight of the catalyst. The present catalyst can comprise a total of less than 0.05 wt % alkali and alkaline earth metal, preferably less than 0.04 wt %, or less than 0.01 wt %, based upon a total weight of the catalyst. Desirably, no alkali or alkaline earth metals, are added to the zeolite.

The catalyst used in the process of the present invention comprises 0.010-0.30 wt %, preferably 0.010-0.15 wt %, of hydrogenation metal. In the context of the present invention, the term "wt %" when relating to the metal content as comprised in a catalyst relates to the wt % of said metal in relation to the total weight of the hydrogenation metal, the zeolite and the binder. The amount of the hydrogenation metal in the catalyst can be determined e.g. by subjecting the catalyst to XRF.

Preferably, the catalyst comprises 0.015-0.095 wt % of hydrogenation metal. It was found that the catalyst comprising the hydrogenation metal in this range has a particularly high benzene yield. Even more preferably, the catalyst comprises 0.020-0.090 wt %, 0.035-0.080 or 0.040-0.075 wt % of hydrogenation metal. In such ranges, the amount of benzene loss (decrease of amount of benzene in the hydrocracking product stream with respect to the hydrocracking feed stream) by the process of the invention and the amount of methane in the hydrocracking product stream is particularly low. The amount of the total aromatics (BTX, ethylbenzene (EB) and heavies) in the hydrocracking product stream is particularly high.

Preferably, the hydrogenation metal is at least one element selected from Group 10 of the periodic table of Elements or rhodium or iridium. The preferred Group 10 element is palladium and platinum, particularly platinum.

The hydrocracking catalyst used in the process of the invention should have a sufficient hydrogenation activity. Accordingly, it is preferred that the catalyst does not comprise secondary metals, such as tin, lead or bismuth that inhibit the hydrogenation activity of the hydrogenation metal. Preferably, the hydrocracking catalyst used in the process of the present invention accordingly comprises less than 0.01 parts tin and less than 0.02 parts lead and less than 0.01 parts bismuth (on the basis of 100 parts by weight of the total catalyst), preferably less than 0.005 parts tin and less than 0.01 parts lead and less than 0.005 parts bismuth (on the basis of 100 parts by weight of total catalyst).

Further, preferably, the hydrocracking catalyst used in the process of the present invention accordingly comprises less than 0.01 parts molybdenum (on the basis of 100 parts by weight of the total catalyst).

The hydrocracking catalyst comprises a shaped body comprising a ZSM-5 zeolite and a binder. The hydrogenation metal is deposited on the shaped body. The presence of the binder in the shaped body gives adequate crush strength to the catalyst to withstand the pressure in a larger reactor.

The binder material can be inorganic oxide materials. The binder material can comprise an aluminum or silicon containing material such as silica, alumina, clay, aluminum phosphate, silica-alumina, or combinations comprising at least one of the foregoing. Alumina ($Al_2O_3$) is a preferred binder. The catalyst can comprise up to 99 wt %, e.g., 1 to 99 wt %, for example 10 to 50 wt % or 20 to 40 wt % of a binder material based on the total weight of the catalyst.

Step (c)

The hydrocracking product stream comprises methane, LPG, BTX. The term "LPG" as used herein refers to the well-established acronym for the term "liquefied petroleum gas". LPG generally consists of a blend of $C_2$-$C_4$ hydrocarbons i.e. a mixture of $C_2$, $C_3$, and $C_4$ hydrocarbons. The process comprises step (c) of separating BTX from the hydrocracking product stream. Step (c) may also involve separating LPG from the hydrocracking product stream. The hydrocracking product stream may be subjected to separation by standard means and methods suitable for separating methane and unreacted hydrogen comprised in the hydrocracking product stream as a first separate stream, the LPG comprised in the hydrocracking product stream as a second separate stream and BTX as a third separate stream. Preferably, the stream comprising BTX is separated from the hydrocracking product stream by gas-liquid separation or distillation. Benzene may be further separated from the stream comprising BTX.

One non-limiting example of such a separation method of the hydrocracking product stream includes a series of distillation steps. The first distillation step at moderate temperature is to separate most of the aromatic species (liquid product) from the hydrogen, $H_2S$, methane and LPG species. The gaseous stream from this distillation is further cooled (to about −30° C.) and distilled again to separate the remaining aromatics species and most of the propane and butane. The gaseous product (mainly hydrogen, $H_2S$, methane and ethane) is then further cooled (to about −100° C.) to separate the ethane and leave the hydrogen, $H_2S$ and methane in the gaseous stream that will be recycled back to the hydrocracking reactor. To control the levels of $H_2S$ and methane in the reactor feed, a proportion of this recycle gas stream is removed from the system as a purge. The quantity of material that is purged depends on the levels of methane and $H_2S$ in the recycle stream which in turn depend on the feed composition. As the purge will contain mainly hydrogen and methane it is suitable for use as a fuel gas or may be further treated (e.g. via a pressure swing adsorption unit) to separately recover a high purity hydrogen stream and a methane/$H_2S$ stream which can be used as a fuel gas.

In a further embodiment, the present invention relates to a process for producing benzene from a feedstream comprising $C_5$-$C_{12}$ hydrocarbons, wherein the said process comprises the process for producing BTX of the present invention further comprising the step of contacting BTX (or only the toluene and xylenes fraction of said BTX produced) with hydrogen under conditions suitable to produce a hydrodealkylation product stream comprising benzene and fuel gas.

The conditions suitable to produce a hydrodealkylation product stream comprising benzene and fuel gas are well-known and are described in detail e.g. in WO2013/182534, incorporated herein by reference.

Processes for hydrodealkylation of hydrocarbon mixtures comprising $C_6$-$C_9$ aromatic hydrocarbons include thermal hydrodealkylation and catalytic hydrodealkylation; see e.g. WO 2010/102712 A2. Catalytic hydrodealkylation is preferred in the context of the present invention as this hydrodealkylation process generally has a higher selectivity towards benzene than thermal hydrodealkylation. Preferably catalytic hydrodealkylation is employed, wherein the hydrodealkylation catalyst is selected from the group consisting of supported chromium oxide catalyst, supported molybdenum oxide catalyst, platinum on silica or alumina and platinum oxide on silica or alumina.

The process conditions useful for hydrodealkylation, also described herein as "hydrodealkylation conditions", can be easily determined by the person skilled in the art. The process conditions used for thermal hydrodealkylation are for instance described in DE 1668719 A1 and include a temperature of 600-800° C., a pressure of 3-10 MPa gauge and a reaction time of 15-45 seconds. The process conditions used for the preferred catalytic hydrodealkylation preferably include a temperature of 500-650° C., a pressure of 3.5-7 MPa gauge and a Weight Hourly Space Velocity of 0.5-2 $h^{-1}$; see also Handbook of Commercial Catalysts: Heterogeneous Catalysts ed. Howard F. Rase (2000) loc. cit.

The hydrodealkylation product stream is typically separated into a liquid stream (containing benzene and other aromatics species) and a gas stream (containing hydrogen, $H_2S$, methane and other low boiling point hydrocarbons) by a combination of cooling and distillation. The liquid stream may be further separated, by distillation, into a benzene stream, a $C_7$ to $C_9$ aromatics stream and a heavy aromatic stream. The $C_7$ to $C_9$ aromatic stream, or some part of it, may be fed back to reactor section as a recycle to increase overall conversion and benzene yield. The heavy aromatic stream, which contains polyaromatic species such as biphenyl, is preferably not recycled to the reactor but may be exported as a separate product stream. The gas stream contains significant quantities of hydrogen and may be recycled back, via a recycle gas compressor, to the reactor section. A recycle gas purge may be used to control the concentrations of methane and $H_2S$ in the reactor feed.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES OF CATALYST SYNTHESIS

In the examples herein described, "zeolite extrudates" refers to ZSM-5 extrudates (CBV 5524G CY (1.6) obtained from Zeolyst International) formed with about 80 wt % ZSM-5 zeolite powder having a silica ($SiO_2$) to alumina ($Al_2O_3$) molar ratio of about 50 and about 20 wt % $Al_2O_3$ as binder. As-obtained extrudates have been prepared by extrusion and subsequent heat treatment and cooling. As-obtained ZSM-5 extrudates were in the H-form and contain <0.05 wt % $Na_2O$.

Preparation of Reference Catalyst

Reference Catalyst A

As-obtained 100 g of ZSM-5 extrudates were pre-dried in air at 150° C. overnight (15 h) and cooled to room temperature in a desiccator.

82.1 g of 0.005M $H_2PtCl_6.6H_2O$ aqueous solution were diluted with 205 g of D.I. water in a flask and heated to 60° C. 100 g of pre-dried ZSM-5 extrudates were added to the solution and the flask was covered. Extrudates were slowly stirred (using a magnetic stirrer) in the solution at 60° C. for 24 h; the liquid was then decanted.

Extrudates were then rinsed with a large volume of water (5 L). Further, the extrudates were washed with 1 L water by stirring and were separated.

Extrudates were heated in air by ramping the temperature (2°/min) from room temperature to 90° C., held 15 h at 90° C., and then ramped from 90° C. (at 3°/min) to 280° C. and held for 6 h. Multiple catalyst samples were prepared using the method described above, and Pt content and catalyst performance data are averaged and are shown in Table 2.

Example Catalyst B. Saving in (iii) impregnation, (iv) washing and (v) heat treatment.

10 g of extrudates were dried in air at 300° C. for 2 h (ramped at 2°/min from room temperature to 300° C.) and the dried extrudates were used immediately after cooling down.

8.21 g of 0.005M $H_2PtCl_6.6H_2O$ aqueous solution were diluted with 20.5 g of D.I. water. 10 g of the pre-dried ZSM-5 extrudates were added to the solution at room temperature and the flask was covered. Extrudates were slowly stirred (using a magnetic stirrer) in solution at room temperature for 1 h and the liquid was then decanted.

Extrudates were then placed in a funnel filled with 50 ml water and the water was dropped out with controlled speed (100 ml/h).

Extrudates were calcined in air with the temperature ramped from room temperature at 2°/min to 90° C., held 3 h at 90° C., and then ramped at 3°/min from 90° C. to 280° C. and held 2 h.

Example Catalyst C. Saving in (ii) drying, (iii) impregnation, (iv) washing and (v) heat treatment.

Extrudates were used without any predrying.

8.21 g of 0.005M $H_2PtCl_6.6H_2O$ aqueous solution were diluted with 20.5 g of D.I. water in a flask and heated to 60° C. 10 g of as-obtained ZSM-5 extrudates were added to the solution and the flask was covered. Extrudates were slowly stirred (using a magnetic stirrer) in solution at room temperature for 1 h and the liquid was then decanted. Extrudates were then placed in a funnel filled with 50 ml water and the water was dropped out with controlled speed (100 ml/h).

Extrudates were calcined in air with the temperature ramped from room temperature at 2°/min to 90° C., held 3 h at 90° C., and then ramped at 3°/min from 90° C. to 280° C. and held 2 h.

Example Catalyst D. Savings in (ii) drying, (iii) impregnation, (iv) washing and (v) heat treatment.

Extrudates were used without any predrying.

8.21 g of 0.005M $H_2PtCl_6.6H_2O$ aqueous solution were diluted with 20.5 g of D.I. water in a flask and heated to 60° C. 10 g of as-obtained ZSM-5 extrudates were added to the solution and the flask was covered. Extrudates were slowly stirred (using a magnetic stirrer) in solution at room temperature for 1 h and the liquid was then decanted. Extrudates were calcined in air with the temperature ramped from RT at 2°/min to 90° C., held 3 h at 90° C., and then ramped at 3°/min from 90° C. to 280° C. and held 2 h.

TABLE 1

| Catalyst | Savings in steps (ii)-(v) relative to reference catalyst | | | |
|---|---|---|---|---|
| | (ii) drying | (iii) impregnation | (iv) Washing | (v) Heating |
| B | | energy, time | material (water), time | energy, time |
| C | energy, time | energy, time | material (water), time | energy, time |
| D | energy, time | energy, time | material (water), time | energy, time |

Catalyst Testing

Referring to Examples 1 to 4, the catalysts described in this application were tested for hydrocracking using a stainless steel tube reactor as described below. 0.10 g catalyst (sized to 20-40 mesh) was diluted to 3 ml by premixing with SiC (30 grit) and was loaded in a reactor.

Reactor description: ¼" inch tube, 0.028" wall thickness. 1/16" thermocouple with a ⅛" spacer bar; 12"×1" brass over-sleeve; reactor bed is approx. 5-6 inches in length in center of sleeve.

The pre-activation of the catalyst (drying, Pt reduction), the composition of the hydrocracking feed stream and the conditions in the reactor are described in Examples 1-4.

In all experiments, the WHSV was adjusted to achieve the benzene purity (amount of benzene/amount of benzene plus $C_6$-nonaromatics) of 99.82 wt % in the product stream.

Example 1

Catalyst A, weight 0.10 g

Catalyst pretreatment: (a) drying: under 40 sccm $H_2$ at 50 psig at 130° C. for 2 h; (b) subsequent $H_2S$ treatment: 40 sccm of $H_2$ (with 50 ppm of $H_2S$) at 50 psig at 350° C. for 30 min Hydrocarbon feed composition: 70.0 wt % Benzene, 15.0 wt % 3-methylpentane, 15.0 wt % methylcyclopentane Hydrocarbon feed rate varied from 20.6 to 24.7 µl/min to run at WHSV 9.9 to 11.9 $h^{-1}$. $H_2$ (+$H_2S$) rate: varied to maintain H2 to HC molar ratio of 4 to 1, and H2S content 50 ppm based on total feed Catalyst bed temperature 470° C., pressure 200 psig Example 2

Catalyst B, weight 0.10 g

Catalyst pretreatment: same as described in example 1

Hydrocarbon feed composition and rate: same as described in example 1.

Hydrocarbon feed rate varied from 18.5 to 22.7 µl/min to run at WHSV 8.9 to 10.9 $h^{-1}$.

$H_2$ (+$H_2S$) rate: varied as described in example 1

Catalyst bed temperature 470° C., pressure 200 psig.

Examples 3

Catalyst C, weight 0.10 g

Catalyst pretreatment: same as described in example 1

Hydrocarbon feed composition and rate: same as described in example 1

Hydrocarbon feed rate varied from 18.9 to 22.7 µl/min to run at WHSV 9.1 to 10.9 h$^{-1}$.
H$_2$ (+H$_2$S) rate: varied as described in example 1
Catalyst bed temperature 470° C., pressure 200 psig Example 4

Catalyst D, weight 0.10 g
Catalyst pretreatment: same as described in example 1
Hydrocarbon feed composition and rate: same as described in example 1.
Hydrocarbon feed rate varied from 18.9 to 22.7 µl/min to run at WHSV 9.1 to 10.9 h$^{-1}$.
H$_2$ (+H$_2$S) rate: varied as described in example 1
Catalyst bed temperature 470° C., pressure 200 psig

TABLE 2

Effect of the preparation method on the catalyst performance

| | | wt % | | | C % in effluent | | | |
|---|---|---|---|---|---|---|---|---|
| Example | Catalyst | Pt, wt % | benzene purity | WHSV, h$^{-1}$ | benzene | methane | light HC[1] | total aromatics |
| 1 | A | 0.066 | 99.82 | 11.16 | 60.89 | 1.21 | 34.15 | 65.74 |
| 2 | B | 0.0808 | 99.82 | 9.06 | 62.11 | 1.24 | 33.16 | 66.68 |
| 3 | C | 0.0758 | 99.82 | 9.72 | 59.89 | 1.13 | 35.79 | 64.10 |
| 4 | D | 0.0711 | 99.82 | 9.68 | 60.06 | 1.19 | 35.19 | 64.68 |

[1]light HC = C$_1$-C$_5$ hydrocarbons

It can be seen that the catalyst prepared according to the invention (B, C, D) shows catalyst performance comparable to the catalyst prepared by methods which involve a large amount of time (A).

Set forth below are some embodiments of the methods disclosed herein.

Embodiment 1

A method for preparing a hydrocracking catalyst comprising: (i) providing a shaped body comprising a zeolite and a binder, wherein the shaped body has been obtained by shaping, calcination and cooling, wherein the zeolite is ZSM-5 having a silica (SiO$_2$) to alumina (Al$_2$O$_3$) molar ratio of 25-75; (ii) optionally drying the shaped body at a temperature of 100-300° C. for a period of at least 1 hour; (iii) depositing a hydrogenation metal on the shaped body by an impregnation for a period of at most 2 hours such that the amount of the hydrogenation metal is 0.010-0.30 wt % with respect to the total catalyst; (iv) optionally rinsing the metal deposited shaped body with water; and (v) heat-treating the metal deposited shaped body in air at a temperature of 250-300° C. for a period of 1-5 hours; wherein the catalyst comprises a total of less than 0.05 wt % sodium and cesium based upon a total weight of the catalyst.

Embodiment 2

The method according to Embodiment 1, wherein the method does not comprise step (ii).

Embodiment 3

The method according to any one of the preceding Embodiments, wherein the method does not comprise step (iv).

Embodiment 4

The method according to any one of the preceding Embodiments, wherein step (v) is performed at temperatures of 270-290° C. for 1-3 hours.

Embodiment 5

The method according to any one of the preceding Embodiments, wherein catalyst comprises a total of less than 0.05 wt % alkali and alkaline earth metal, preferably less than 0.04 wt %, or less than 0.01 wt %, based upon a total weight of the catalyst.

Embodiment 6

The method according to Embodiment 1, wherein the zeolite has a silica (SiO$_2$) to alumina (Al$_2$O$_3$) molar ratio of 30-65, preferably 35-60, more preferably 40-55.

Embodiment 7

The method according to any one of the preceding Embodiments, wherein the amount of the hydrogenation metal is 0.015-0.095 wt %, preferably 0.035-0.080 wt %, or 0.040-0.075 wt %, with respect to the total catalyst.

Embodiment 8

The method according to any one of the preceding Embodiments, wherein the hydrogenation metal is platinum.

Embodiment 9

The method according to any one of the preceding Embodiments, wherein hydrocracking catalyst comprises 0.01 parts bismuth, preferably comprises less than 0.01 parts tin, less than 0.02 parts lead, less than 0.01 parts bismuth, and less than 0.01 parts molybdenum, (on the basis of 100 parts by weight of the total catalyst).

Embodiment 10

The method according to any one of the preceding Embodiments, wherein the amount of the binder in the hydrocracking catalyst is 10-50 wt % with respect to the total catalyst.

Embodiment 11

The method according to any one of the preceding Embodiments, wherein the hydrocracking catalyst is an extrudate having an average diameter of 0.1-15 mm.

Embodiment 12

The method according to any one of the preceding Embodiments, wherein the catalyst comprises a total of less than 0.04 wt % sodium and cesium, or less than 0.01 wt %, based upon a total weight of the catalyst.

Embodiment 13

The method according to any one of the preceding Embodiments, wherein no alkali or alkaline earth metals are added to the zeolite.

Embodiment 14

The method according to any one of the preceding Embodiments, wherein the zeolite is in the hydrogen form.

Embodiment 15

The method according to any one of the preceding Embodiments, wherein the zeolite is not been base exchanged.

Embodiment 16

The method according to any one of the preceding Embodiments, wherein the zeolite is not ion exchanged with any metal from Group IA or Group IIA of the Periodic Table of Elements.

Embodiment 17

A process for producing BTX, comprising: (a) providing a hydrocracking feed stream comprising $C_5$-$C_{12}$ hydrocarbons; (b) contacting the hydrocracking feed stream in the presence of hydrogen with the hydrocracking catalyst formed by the method of any of the preceding Embodiments, under process conditions including a temperature of 425-580° C., a pressure of 300-5000 kPa gauge and a Weight Hourly Space Velocity of 3-30 $h^{-1}$ to produce a hydrocracking product stream comprising BTX; and (c) separating the BTX from the hydrocracking product stream.

Embodiment 18

The process according to Embodiment 17, wherein the hydrocracking feed stream comprises a fresh feed stream which is first stage or multi-stage hydro-treated pyrolysis gasoline, straight run naphtha, hydrocracked gasoline, light coker naphtha and coke oven light oil, FCC gasoline, reformate or mixtures thereof, which has optionally been subjected to treatments such as hydrogenation, enrichment of mono-aromatic compounds and/or depentanization and optionally a stream recycled from the hydrocracking product stream.

Embodiment 19

The process according to any one of Embodiments 17-18, wherein the hydrocracking feed stream is provided by a process which does not involve the step of removing benzene.

Embodiment 20

The process according to any one of Embodiments 17-19, wherein the hydrocracking feed stream comprises 10-90 wt % of benzene.

The invention claimed is:

1. A method for preparing a hydrocracking catalyst comprising:
    (i) providing a shaped body comprising a zeolite and a binder, wherein the shaped body has been obtained by shaping, calcination and cooling, wherein the zeolite is ZSM-5 having a silica ($SiO_2$) to alumina ($Al_2O_3$) molar ratio of 25-75;
    (ii) optionally drying the shaped body at a temperature of 100-300° C. for a period of at least 1 hour;
    (iii) depositing a hydrogenation metal on the shaped body by an impregnation for a period of at most 2 hours such that the amount of the hydrogenation metal is 0.010-0.30 wt % with respect to the total catalyst;
    (iv) optionally rinsing the metal deposited shaped body with water; and
    (v) heat-treating the metal deposited shaped body in air at a temperature of 250-300° C. for a period of 1-5 hours to yield the hydrocracking catalyst;
    wherein the hydrocracking catalyst comprises a total of less than 0.05 wt % sodium and cesium, based upon a total weight of the catalyst.

2. The method according to claim 1, wherein the method does not comprise step (ii).

3. The method according to claim 2, wherein the amount of the binder in the hydrocracking catalyst is 10-50 wt % with respect to the total catalyst.

4. The method according to claim 1, wherein the method does not comprise step (iv).

5. The method according to claim 4, wherein the amount of the binder in the hydrocracking catalyst is 10-50 wt % with respect to the total catalyst.

6. The method according to claim 1, wherein step (v) is performed at temperatures of 270-290° C. for 1-3 hours.

7. The method according to claim 1, wherein catalyst comprises a total of less than 0.05 wt % alkali and alkaline earth metal, based upon a total weight of the catalyst.

8. The method according to claim 1, wherein the zeolite has a silica ($SiO_2$) to alumina ($Al_2O_3$) molar ratio of 30-65.

9. The method according to claim 1, wherein the amount of the hydrogenation metal is 0.015-0.095 wt %, with respect to the total catalyst.

10. The method according to claim 1, wherein the hydrogenation metal is platinum.

11. The method according to claim 1, wherein hydrocracking catalyst comprises 0.01 parts bismuth, on the basis of 100 parts by weight of the total catalyst.

12. The method according to claim 1, wherein the amount of the binder in the hydrocracking catalyst is 10-50 wt % with respect to the total catalyst.

13. A process for producing BTX, comprising:
    (a) providing a hydrocracking feed stream comprising $C_5$-$C_{12}$ hydrocarbons,
    (b) contacting the hydrocracking feed stream in the presence of hydrogen with the hydrocracking catalyst formed by the method of claim 1, under process conditions including a temperature of 425-580° C., a pressure of 300-5000 kPa gauge and a Weight Hourly Space Velocity of 3-30 $h^{-1}$ to produce a hydrocracking product stream comprising BTX and
    (c) separating the BTX from the hydrocracking product stream.

14. The process according to claim 13, wherein the hydrocracking feed stream comprises a fresh feed stream which is first stage or multi-stage hydro-treated pyrolysis gasoline, straight run naphtha, hydrocracked gasoline, light coker naphtha and coke oven light oil, FCC gasoline, reformate or mixtures thereof, which has optionally been subjected to treatments such as hydrogenation, enrichment of mono-aromatic compounds and/or depentanization and optionally a stream recycled from the hydrocracking product stream.

15. The process according to claim 14, wherein the hydrocracking feed stream is provided by a process which does not involve the step of removing benzene.

16. The process according to claim 13, wherein the hydrocracking feed stream is provided by a process which does not involve the step of removing benzene.

17. The process according to claim 14, wherein the hydrocracking feed stream comprises 10-90 wt % of benzene.

18. The process according to claim 13, wherein the hydrocracking feed stream comprises 10-90 wt % of benzene.

19. A method for preparing a hydrocracking catalyst comprising:
(i) providing a shaped body comprising a zeolite and a binder, wherein the shaped body has been obtained by shaping, calcination and cooling, wherein the zeolite is ZSM-5 having a silica ($SiO_2$) to alumina ($Al_2O_3$) molar ratio of 25-75;
(ii) optionally drying the shaped body at a temperature of 100-300° C. for a period of at least 1 hour;
(iii) depositing a hydrogenation metal on the shaped body by an impregnation for a period of at most 2 hours such that the amount of the hydrogenation metal is 0.010-0.30 wt % with respect to the total catalyst; and
(iv) heat-treating the metal deposited shaped body in air at a temperature of 250-300° C. for a period of 1-5 hours to yield the hydrocracking catalyst;
wherein the hydrocracking catalyst comprises a total of less than 0.05 wt % sodium and cesium, based upon a total weight of the catalyst.

* * * * *